(12) United States Patent
Hirano et al.

(10) Patent No.: US 11,833,791 B2
(45) Date of Patent: Dec. 5, 2023

(54) VACUUM HEAT INSULATOR, AND HEAT-INSULATING CONTAINER AND HEAT-INSULATING WALL USING SAME

(71) Applicant: Panasonic Intellectual Property Management Co., Ltd., Osaka (JP)

(72) Inventors: Toshiaki Hirano, Hyogo (JP); Hideji Kawarazaki, Osaka (JP); Tomoaki Kitano, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 353 days.

(21) Appl. No.: 17/428,227

(22) PCT Filed: Aug. 25, 2020

(86) PCT No.: PCT/JP2020/031928
§ 371 (c)(1),
(2) Date: Aug. 3, 2021

(87) PCT Pub. No.: WO2021/044893
PCT Pub. Date: Mar. 11, 2021

(65) Prior Publication Data
US 2022/0105702 A1    Apr. 7, 2022

(30) Foreign Application Priority Data
Sep. 5, 2019   (JP) ................... 2019-161638

(51) Int. Cl.
*B32B 3/30* (2006.01)
*B32B 7/05* (2019.01)
(Continued)

(52) U.S. Cl.
CPC ............... *B32B 3/30* (2013.01); *B32B 7/05* (2019.01); *B32B 27/06* (2013.01); *B65D 65/40* (2013.01);
(Continued)

(58) Field of Classification Search
CPC .......... F16L 59/065; F16L 59/06; B32B 3/30; B32B 3/26; B32B 7/05; B32B 27/08;
(Continued)

(56) References Cited

U.S. PATENT DOCUMENTS

2017/0167781 A1    6/2017  Mukherjee et al.
2020/0331252 A1*  10/2020  Yamane .................... B32B 3/28

FOREIGN PATENT DOCUMENTS

| JP | 9-119771 | 5/1997 |
|---|---|---|
| JP | 2010-255805 | 11/2010 |

(Continued)

OTHER PUBLICATIONS

International Search Report issued in International Application No. PCT/JP2020/031928, dated Oct. 27, 2020, 4 pages w/translation.

*Primary Examiner* — Robert J Hicks
(74) *Attorney, Agent, or Firm* — Hamre, Schumann, Mueller & Larson, P.C.

(57) ABSTRACT

A vacuum heat insulator according to the present invention includes a core material and an outer packaging material including an inner plate and an outer plate each of which includes a resin sheet. The core material is covered by the outer packaging material. The vacuum heat insulator further includes a heat welded part formed by welding a part of the inner plate and a part of the outer plate. The heat welded part has a recess having a thickness that is 50% or less of an average thickness of the heat welded part. As a result thereof, the adhesion and airtightness of the heat welded part can be maintained, and a highly reliable vacuum heat insulator can be provided.

9 Claims, 12 Drawing Sheets

(51) Int. Cl.
- *B32B 27/06* (2006.01)
- *B65D 65/40* (2006.01)
- *B65D 81/38* (2006.01)
- *F16L 59/06* (2006.01)
- *F25D 23/06* (2006.01)
- *F16L 59/065* (2006.01)

(52) U.S. Cl.
CPC ........ *B65D 81/3823* (2013.01); *F16L 59/065* (2013.01); *F25D 23/065* (2013.01); *B32B 2307/304* (2013.01); *B32B 2439/00* (2013.01)

(58) Field of Classification Search
CPC ... B32B 27/06; B32B 2307/304; B65D 65/40; B65D 81/3823; B65D 81/3813; B65D 81/3811; B65D 81/3816
USPC ................ 220/592.26, 592.2, 592.25, 62.22; 428/36.92, 36.9, 35.7
See application file for complete search history.

(56) References Cited

FOREIGN PATENT DOCUMENTS

| | | |
|---|---|---|
| JP | 2010-285219 | 12/2010 |
| WO | 2017/100003 | 6/2017 |

\* cited by examiner

VACUUM HEAT INSULATOR, AND HEAT-INSULATING CONTAINER AND HEAT-INSULATING WALL USING SAME

This application is a U.S. national stage application of the PCT International Application No. PCT/JP2020/031928 filed on Aug. 25, 2020, which claims the benefit of foreign priority of Japanese patent application No. 2019-161638 filed on Sep. 5, 2019, the contents all of which are incorporated herein by reference.

TECHNICAL FIELD

The present disclosure relates to a vacuum heat insulator, and a heat-insulating container and a heat-insulating wall using the vacuum heat insulator.

BACKGROUND ART

PTL 1 proposes a technique in which a heat-insulating box is evacuated to create a vacuum so that the heat-insulating box is used as a vacuum heat insulating material.

PTL 2 proposes a technique in which, after a resin film and a resin sheet are heat welded, irregularities are formed on a sealing part in order to suppress gas intrusion from a welded cross section.

CITATION LIST

Patent Literatures

PTL 1: Unexamined Japanese Patent Publication No. H09-119771
PTL 2: Unexamined Japanese Patent Publication No. 2010-255805

SUMMARY OF THE INVENTION

A vacuum heat insulator according to the present disclosure includes a core material and an outer packaging material including an inner plate and an outer plate each of which includes a resin sheet. The core material is covered by the outer packaging material. The vacuum heat insulator further includes a heat welded part formed by welding a part of the inner plate and a part of the outer plate. The heat welded part has a recess having a thickness that is 50% or less of an average thickness of the heat welded part.

With the configuration according to the present disclosure, adhesion or airtightness of the heat welded part is maintained. Furthermore, an occurrence of thermal damage and an occurrence of warpage, deformation, and cracks in the heat welded part are reduced. Accordingly, a highly reliable vacuum heat insulator, heat-insulating container, and heat-insulating wall are provided.

The vacuum heat insulator according to the present disclosure can maintain a degree of vacuum and heat insulating performance for a long period of time. Accordingly, a highly reliable vacuum heat insulator is provided.

Figure 1:
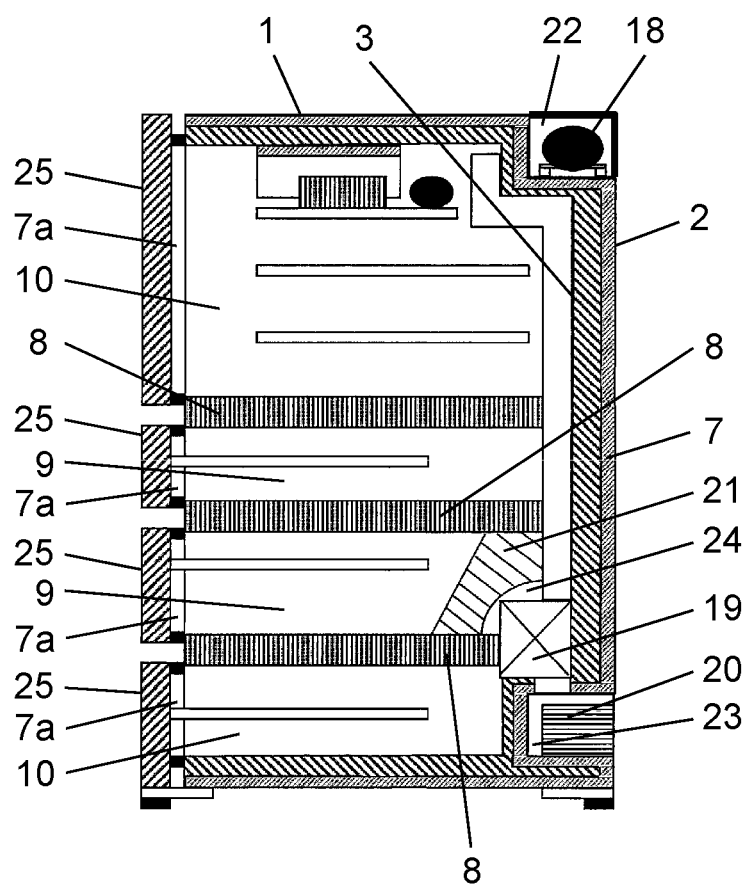
FIG. 1 is a cross-sectional view of a refrigerator including a vacuum heat insulator according to a first exemplary embodiment.

DESCRIPTION OF EMBODIMENTS (Underlying Knowledge of the Present Disclosure)

In recent years, from the viewpoint of prevention of global warming, improvement of energy saving is strongly demanded. In household electrical appliances, improvement in energy saving is also an urgent problem. In particular, in heat-retaining and cold-keeping devices such as refrigerators, freezers, and vending machines, a heat insulating material having excellent heat insulating performance is required from the viewpoint of efficiently using heat.

As a general heat insulating material, a fiber material such as glass wool or foam such as a urethane foam is used. In order to improve the heat insulating performance of such heat insulating material, it is necessary to increase the thickness of the heat insulating material. However, in a case where there is a restriction in a space which is to be filled with the heat insulating material (for example, in a case where space saving is required or the space is required to be effectively used), it is difficult to increase the thickness of the heat insulating material.

In view of this, a vacuum heat insulating material has been proposed as a high-performance heat insulating material. The vacuum heat insulating material is formed such that a core material serving as a spacer is inserted into an outer packaging material having a gas barrier property, and the inside of the outer packaging material is depressurized and sealed.

The vacuum heat insulating material has heat insulating performance about 20 times higher than that of a urethane foam. As a result, sufficient heat insulating performance can be obtained even if the thickness of the heat insulating material is reduced.

Accordingly, the internal volume of a heat-insulating box can be increased by using the vacuum heat insulating material. Furthermore, improvement in energy saving is achieved by improvement in heat insulating performance.

For example, in a heat-insulating box constituting a refrigerator body of a refrigerator, a heat-insulating space between inner and outer boxes is filled with a urethane foam. Then, a vacuum heat insulating material is additionally provided in the heat-insulating space. Thus, the heat insulating property can be enhanced without increasing the thickness of the heat insulating material. As a result, the internal volume of the heat-insulating box can be increased.

In a refrigerator or the like, a heat-insulating space of a heat-insulating box generally has a complicated shape. In addition, it is generally difficult to process the vacuum heat insulating material to conform to the complicated shape, particularly to process the vacuum heat insulating material in the thickness direction. Therefore, the vacuum heat insulating material generally has a flat plate shape. For this reason, there is a limit to increase an area covered by the vacuum heat insulating material, in other words, a proportion of the area of the vacuum heat insulating material to the total heat transfer area of the heat-insulating box.

In view of this, PTL 1 proposes a technique in which, after the heat-insulating space of the heat-insulating box is filled with an open-cell urethane and the open-cell urethane is foamed, the heat-insulating box is evacuated to create a vacuum so that the heat-insulating box is used as a vacuum heat insulating material.

The applicant of the present application has also proposed a technique in which, after a heat-insulating space of a heat-insulating box which is to serve as a refrigerator body is filled with an open-cell urethane and the open-cell urethane is foamed, the heat-insulating box is evacuated to create a vacuum so that the heat-insulating box is used as a vacuum heat insulating material, as in PTL 1.

The overall heat insulating performance of the vacuum heat insulator thus obtained is higher than that of a heat insulating material obtained by combining a conventional flat vacuum heat insulating material and foamed urethane for filling a gap between the vacuum heat insulating material and the foamed urethane. Therefore, the thickness of the heat insulating material is reduced to increase the internal volume of the heat-insulating box, reduce the size in external appearance, and reduce the weight.

As described above, the entire area of the heat-insulating box can be insulated by using the vacuum heat insulator including an open-cell urethane as a core material and a resin molding material as an outer packaging material. Therefore, when the vacuum heat insulator is used in, for example, a refrigerator, the thickness of the heat-insulating box can be reduced, and the internal volume (storage space) can be further increased.

In addition, the following effects are expected, when the abovementioned vacuum heat insulating material is applied for a use in which there is no complicated shape but heat insulating properties are strongly demanded, for example, a panel for a heat-insulating container such as a liquefied natural gas (LNG) storage tank storing an ultra-low temperature substance (for example, LNG), or a tank of an LNG transport tanker. It is possible to effectively suppress intrusion of heat into the heat-insulating container while reducing the wall thickness of the heat-insulating container. Therefore, in the case of the LNG tank, the generation of boil-off gas (BOG) is effectively reduced. As a result, the natural vaporization rate (boil-off rate, BOR) of LNG can be lowered.

In addition, in order to create a vacuum inside the outer packaging material including the inner box and the outer box, it is necessary to form an airtight sealed space. To this end, flanges of the inner box and the outer box are heat welded to each other. Regarding such heat welding, it is common to heat weld resin films having a thickness of 0.1 mm or less or heat weld a resin film having a thickness of 0.1 mm or less to a resin sheet having a thickness of 0.2 mm or more. A technique of forming irregularities on a sealed part after heat welding in order to suppress gas intrusion from a welded cross section is proposed (PTL 2).

However, when resin sheets having a thickness of 0.2 mm or more are heat welded, heat is less likely to be transmitted to an adhesive layer located farther from a heat source due to a large thickness. Therefore, it is difficult to achieve highly reliable adhesion by uniformly melting the adhesive layer without thermally damaging the heat source. In addition, it is necessary to apply pressure during welding in order to increase adhesion. For this reason, resins crushed by the application of pressure may leak out of the pressed part. The leaked resin may be cooled and solidified to be turned into protrusion, resulting in that warpage, deformation, and cracks may occur in the flanges. In addition, such protrusions may be randomly generated, and thus, impair design.

The inventors have found that there are problems as described above, and arrived at the subject matter of the present disclosure in order to solve the problems.

The present disclosure provides a vacuum heat insulator capable of reducing warpage, deformation, and cracks of a flange by preventing resin leakage to the outside of a pressed part and reducing residual strain of the flange.

Exemplary embodiments will be described in detail below with reference to the drawings. However, the description may be omitted. For example, a detailed description of well-known matters, and a duplicate description of substantially identical configurations may not be provided.

Note that the accompanying drawings and the following description are provided to help those skilled in the art to fully understand the present disclosure and are not intended to limit the subject matter recited in the appended claims.

First Exemplary Embodiment

A first exemplary embodiment will be described below with reference to FIGS. 1 to 5.

An example in which a vacuum heat insulator according to the present exemplary embodiment is applied to a refrigerator door will be described.

[Structure]

In FIG. 1, in refrigerator 1 including refrigerator door 25 provided with a vacuum heat insulator, heat-insulating box 7 includes a foamed heat insulating material filled in a space between outer box 2 and inner box 3. The inside of heat-insulating box 7 is partitioned into freezing compartment 9 and refrigerating compartment 10 by partition 8.

Compressor 18 is disposed in machine chamber 22 above heat-insulating box 7. Evaporating pan 20 is disposed in lower machine chamber 23. Evaporator 19 is disposed in cooling chamber 24 formed in a back surface of freezing compartment 9.

Freezing compartment 9 and cooling chamber 24 are partitioned by cooling chamber wall 21. Refrigerator door 25 is disposed in front opening 7a of heat-insulating box 7.

Figure 2:
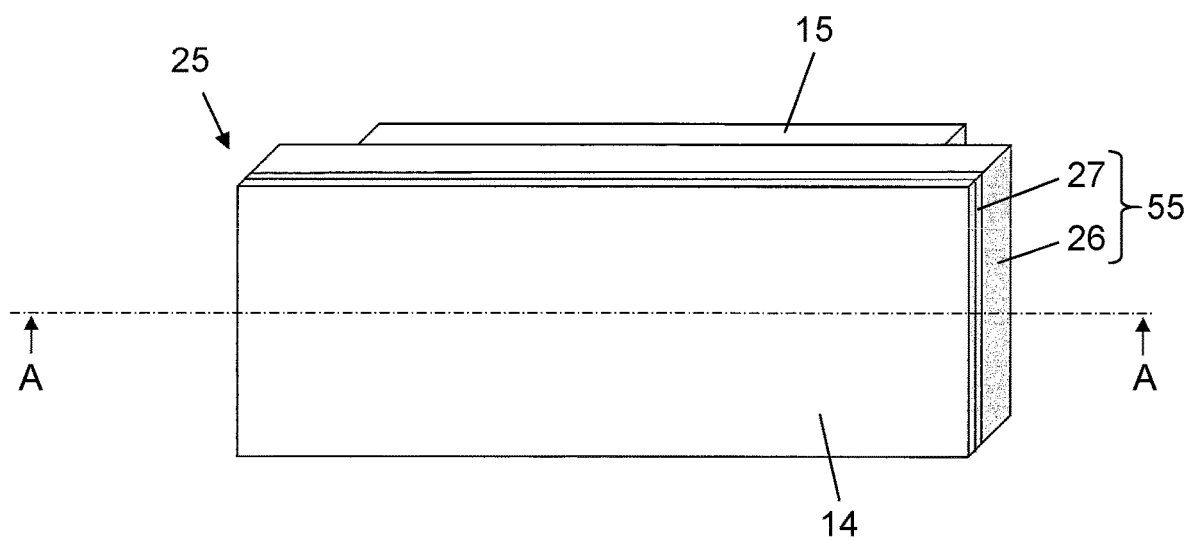
FIG. 2 is a perspective view of a refrigerator door including the vacuum heat insulator according to the first exemplary embodiment.
Figure 3A:
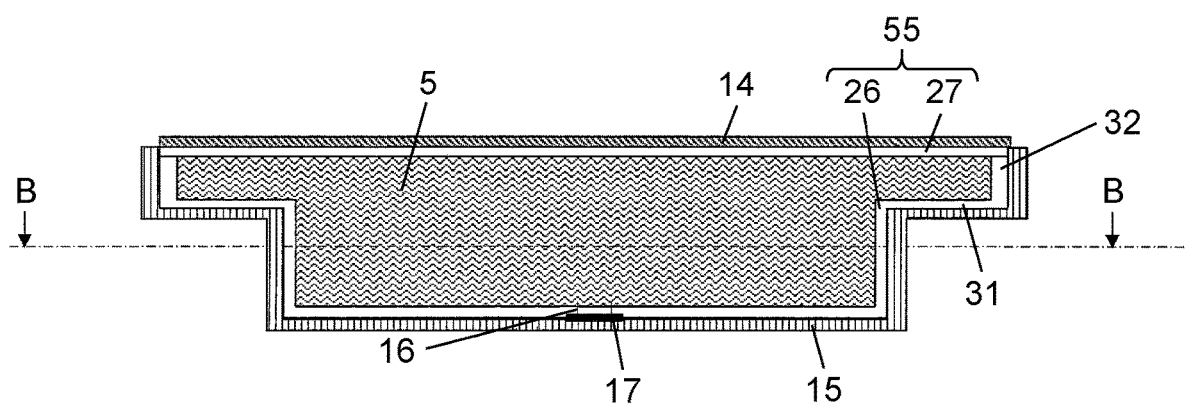
FIG. 3A is a cross-sectional view taken along line A-A of FIG. 2.
Figure 3B:
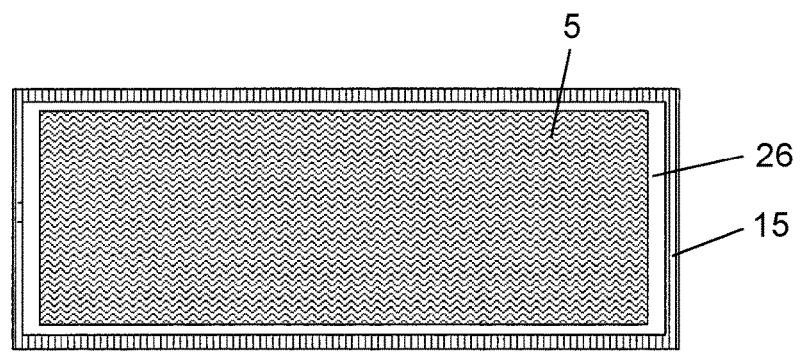
FIG. 3B is a cross-sectional view taken along line B-B of FIG. 3A.

As shown in FIGS. 2, 3A, and 3B, refrigerator door 25 includes: outer plate 27 having gas barrier layer 31 such as oxygen formed therein; outside exterior component 14 that is disposed on a surface of outer plate 27 and that is a glass plate or a metal plate; inner plate 26 having gas barrier layer 31 such as oxygen formed therein; inside exterior component 15 disposed on a surface of inner plate 26 and made of ABS resin or the like; and open-cell urethane foam 5 (a core material of a vacuum heat insulator) filled in a heat-insulating space between outer plate 27 and inner plate 26. Here, outer plate 27 and inner plate 26 correspond to outer packaging material 55 in the present exemplary embodiment.

Outer packaging material 55 wraps the outer surface of open-cell urethane foam 5 (the core material of the vacuum heat insulator).

Specifically, the vacuum heat insulator according to the present exemplary embodiment includes a core material (open-cell urethane foam 5) that serves as a spacer and outer packaging material 55 having gas barrier properties. The vacuum heat insulator is formed such that the core material is inserted into outer packaging material 55, and the inside of the outer packaging material 55 is depressurized through exhaust port 16 provided in a part of inner plate 26 and further sealed by sealing material 17. Outer peripheries of outer plate 27 and inner plate 26 are bonded and sealed by heat welding layer 32.

As illustrated in FIGS. 3A and 3B, outside exterior component 14 and inside exterior component 15 are bonded to the vacuum heat insulator according to the present exemplary embodiment with an adhesive or the like, and thus, refrigerator door 25 is completed.

Figure 4A:
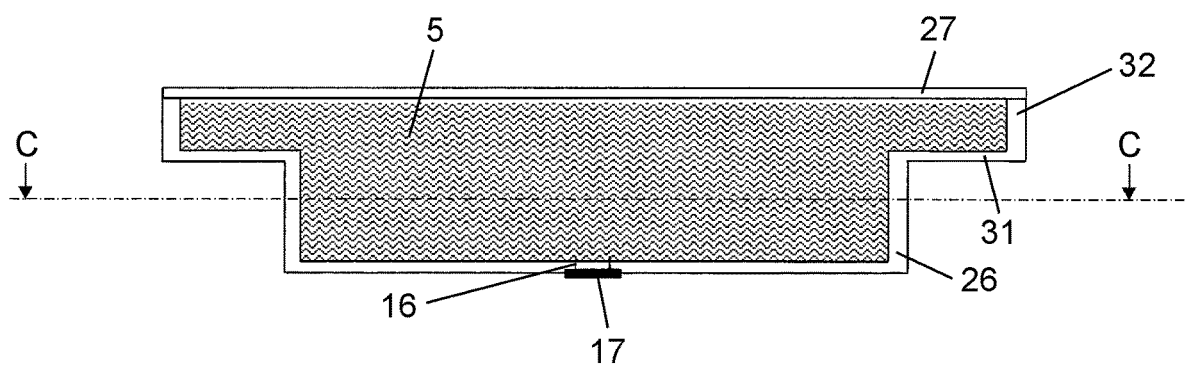
FIG. 4A is a cross-sectional view of the vacuum heat insulator according to the first exemplary embodiment.
Figure 4B:
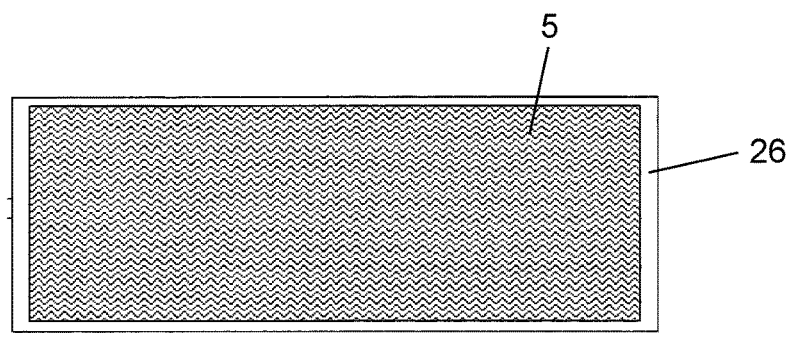
FIG. 4B is a cross-sectional view taken along line C-C of FIG. 4A.

FIGS. 4A and 4B illustrate a state before outside exterior component 14 and inside exterior component 15 of refrigerator door 25 are bonded, that is, illustrate the vacuum heat insulator according to the present exemplary embodiment.

[Manufacturing Method]

Next, a method for manufacturing refrigerator door 25 including the vacuum heat insulator according to the first exemplary embodiment will be described.

Figure 5:
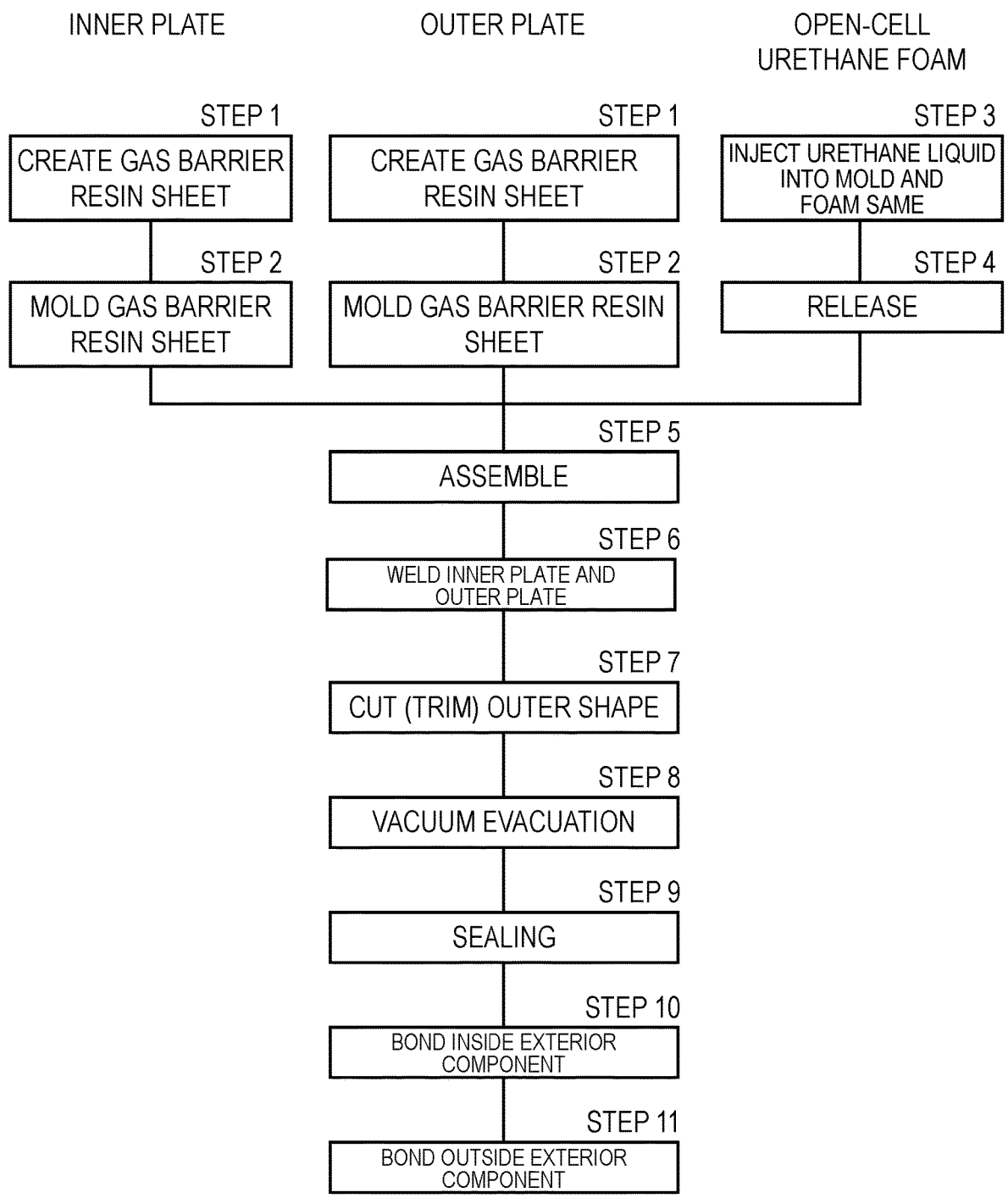
FIG. 5 is a flowchart illustrating a method for manufacturing the refrigerator door according to the first exemplary embodiment.

In FIG. 5, outer plate 27 and inner plate 26 are made of a material having a high oxygen gas barrier property and a high water vapor gas barrier property, and mainly suppress permeation of air and water vapor.

First, a method for manufacturing outer plate 27 and inner plate 26 will be described. For example, a multilayer sheet in which an ethylene-vinyl alcohol copolymer resin (EVOH), which is a material having low oxygen permeability, is sandwiched between polypropylene or polyethylene, which is a material having low water vapor permeability, is created with an extrusion molding machine or the like (step 1). Next, the created multilayer sheet is molded into a shape conforming to the shape of a portion where heat insulation is required by vacuum molding, pressure molding, blow molding, or the like (step 2).

It is to be noted that a similar effect can also be obtained by using polyvinyl alcohol (PVA) instead of EVOH. Exhaust port 16 is provided in inner plate 26, and a welding mechanism (not illustrated) is connected thereto. Exhaust port 16 is sealed by sealing material 17 including at least a metal foil having a high oxygen gas barrier property.

When outer plate 27 is perfectly flat, a resin laminate film containing a metal layer such as aluminum or stainless steel is often used. This is because the thickness of outer plate 27 can be set to 0.1 mm or less by using a film. This makes it easy to uniformly heat the vacuum heat insulator at the time of heat welding described later, and thus, it is possible to obtain a highly reliable vacuum heat insulator. However, when outer plate 27 does not have a flat surface, a resin sheet with a thickness of 0.2 mm or more similar to that used for inner plate 26 is used from the viewpoint of design and the like.

Next, a method for producing open-cell urethane foam 5 will be described. Open-cell urethane foam 5 is molded by injecting a urethane liquid into a metal mold (not shown) having a shape of a heat-insulating space between outer plate 27 and inner plate 26, foaming the same, and releasing the same from the mold (steps 3 and 4).

Next, a method for manufacturing refrigerator door 25 will be described with reference to FIG. 5.

A molded article of open-cell urethane foam 5 is placed in inner plate 26 and covered with outer plate 27 (step 5). Next, inner plate 26 and outer plate 27 are heat welded by applying heat and pressure to an outer peripheral portion where inner plate 26 and outer plate 27 are in contact (step 6).

In this case, when the layers to be bonded of outer plate 27 and inner plate 26 are polypropylene layers, polypropylene resins are heat welded to each other as shown in FIGS. 3A and 4A.

Figure 4C:
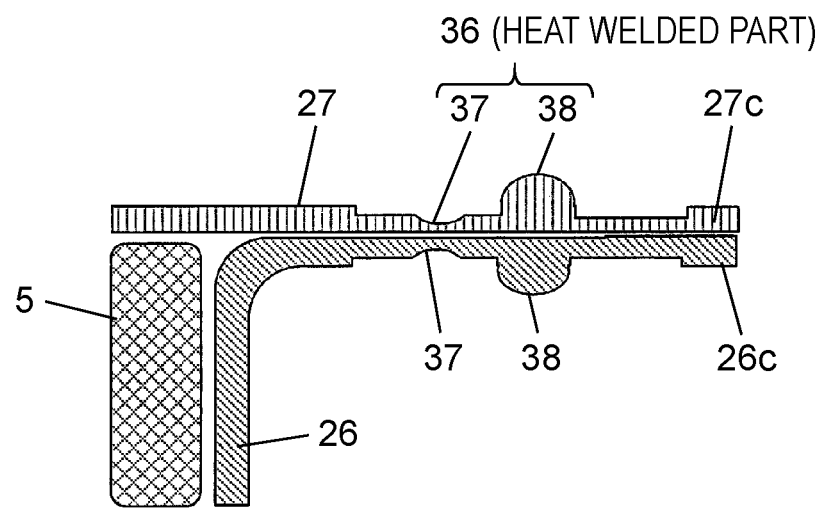
FIG. 4C is an enlarged cross-sectional view of a heat welded part of the refrigerator door according to the first exemplary embodiment.
Figure 4D:
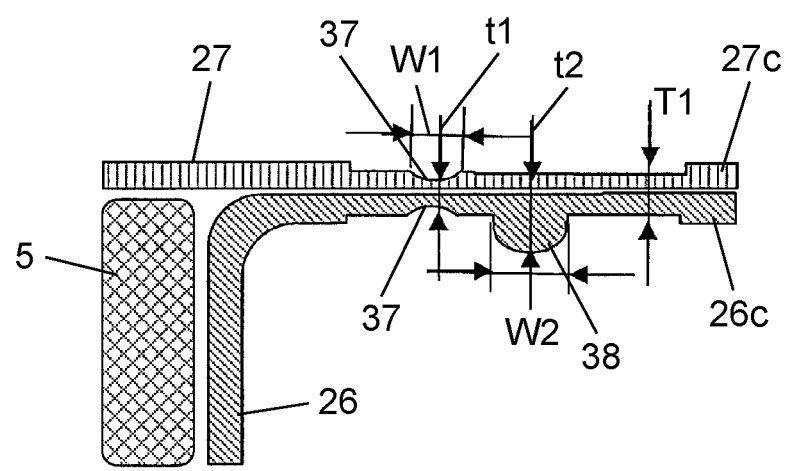
FIG. 4D is an enlarged cross-sectional view of a heat welded part of the refrigerator door according to the first exemplary embodiment.

As shown in FIGS. 4C and 4D, flange 26c of inner plate 26 and flange 27c of outer plate 27 are heat welded to each other as follows. Specifically, flanges 26c and 27c are held between an upper mold and a lower mold (not shown) heated to 160° C. or higher, which is a temperature at which polypropylene is melted, maintained for 20 to 30 seconds under a prescribed pressure condition, and cooled to room temperature after pressure release.

At this time, when recess 37 is provided in heat welded part 36, an upper mold and a lower mold provided with protrusions (not illustrated) are used. When protrusion 38 is provided in heat welded part 36, recesses (not shown) are used in an upper mold and a lower mold provided with recesses (not shown). Accordingly, the heat welded part can be formed into a desired shape.

Although not shown, various gas adsorbents (not shown) may be placed in box-shaped inner plate 26 together with open-cell urethane foam 5.

As the gas adsorbent, an air adsorbent that selectively adsorbs air or a moisture adsorbent that adsorbs moisture is known. Such gas adsorbent adsorbs a remaining gas that cannot be exhausted by evacuation and a trace amount of gas that permeates through inner plate 26 and outer plate 27 having a high gas barrier property for a long period of time. This makes it possible to maintain the degree of vacuum for a long period of time.

After the heat welding (step 6) is performed in this manner, the outer shape is cut into the size of outer plate 27 in a forming process (step 7).

The vacuum heat insulator including inner plate 26 and outer plate 27 that have been heat welded is evacuated for a predetermined time by a vacuum evacuation device (not shown) through exhaust port 16 (step 8). Next, weld sealing is performed by ultrasonic welding or the like using sealing material 17 (step 9). The vacuum heat insulator is obtained by the above steps.

In order to shorten the evacuation time and improve productivity, it is desirable that a pore (not shown) of open-cell urethane foam 5 (core material) is connected to exhaust port 16. Sealing material 17 includes an adhesive layer, a metal foil, and a heat-resistant protective layer (which are not shown) in this order from a side closer to exhaust port 16. The adhesive layer is located inside the metal foil and has a melting point of 180° C. or lower, and the heat-resistant protective layer is located outside the metal foil and has a melting point of 200° C. or higher.

In the present exemplary embodiment, exhaust port 16 is substantially circular, and the hole diameter of exhaust port 16 is 1 mm or more.

Then, outside exterior component 15 and inside exterior component 14 are bonded to the obtained vacuum heat insulator (steps 10 and 11). Refrigerator door 25 is completed by the above steps.

In step 10, outside exterior component 14 is bonded to the upper surface of outer plate 27 as shown in FIG. 4D. At this time, the flat surface on the upper surface side of outer plate 27 and the flat surface of outside exterior component 14 are bonded to each other. For this reason, protrusion 38 is not provided on the bonding surface side of outer plate 27, and is provided only on the inner side corresponding to the back side of flange 26c. With such a configuration, refrigerator door 25 having high bonding strength can be achieved without generating a gap between outer plate 27 and outside exterior component 14.

In the present exemplary embodiment, recess 37 having thickness t1 which is 50% or less of average thickness T1 of heat welded part 36 and having a rounded cross-sectional shape is formed in heat welded part 36 where the resin sheets of inner plate 26 and outer plate 27 are partially welded to each other.

Further, protrusion 38 having thickness t2 greater than average thickness T1 of heat welded part 36 is formed in heat welded part 36.

Width W1 of recess 37 is smaller than width W2 of protrusion 38.

Further, recess 37 and protrusion 38 are located adjacent to each other.

As described above, recess 37 having thickness t1 which is 50% or less of average thickness T1 of heat welded part 36 is formed in heat welded part 36 where the resin sheets of inner plate 26 and outer plate 27 are partially welded to each other. Thus, the welded cross-sectional area is reduced, and the amount of gas that enters from the outside through the welded cross section is reduced. As a result, a degree of vacuum and heat insulating performance of the vacuum heat insulator can be maintained for a long period of time.

In addition, since protrusion 38 having thickness t2 larger than average thickness T1 of heat welded part 36 is provided in heat welded part 36, it is possible to prevent a leakage of resin to portions other than the pressed part during heat welding. In addition, the formation of protrusion 38 having a constant thickness in the pressed part can make the maximum thickness uniform, and the residual strain of the flange can be reduced. Consequently, an occurrence of warpage, deformation, and cracks in heat welded part 36 can be prevented, whereby a degree of vacuum and heat insulating performance of refrigerator door 25 can be maintained for a long period of time.

Regarding recess 37, the amount of gas permeating from the outside greatly depends on the thickness of heat welded part 36. On the other hand, width W1 of recess 37 has less effect on the amount of permeating gas than the thickness. In addition, regarding protrusion 38, width W2 of protrusion 38 greatly affects the suppression of the occurrence of warpage, deformation, and cracks. From the above, the maximum effect can be obtained by greatly reducing thickness t1 of recess 37, setting width W1 of recess 37 to be smaller than width W2 of protrusion 38, and increasing width W2 without increasing thickness t2 of protrusion 38.

For example, in a case where a first surface of heat welded part 36 is an exterior surface, or in a case where it is intended to butt a flat surface of the first surface against a flat surface of an exterior component, protrusion 38 may be provided only on a second surface opposite to the first surface. Thus, it is possible to butt them against each other without forming a gap. Therefore, it is possible to minimize heat leakage and obtain desired performance without impairing heat insulating performance.

Further, when recess 37 and protrusion 38 are formed so as to be adjacent to each other, a resin crushed by pressure applied for forming recess 37 moves to adjacent protrusion 38, so that a stable recess and protrusion pattern can be obtained.

By setting the thickness of the resin sheet forming inner plate 26 and outer plate 27 to 0.2 mm or more, refrigerator door 25 (vacuum heat insulator) having a complicated shape can be obtained by resin molding such as blow molding or vacuum molding.

In addition, since recess 37 has a rounded cross-sectional shape, it is possible to prevent a loss of recessed shape when heat welded part 36 is released from the molds used for heat welding.

Effects and Others

Refrigerator door 25 (vacuum heat insulator) includes open-cell urethane foam 5 (core material), outer packaging material 55, and heat welded part 36 formed by welding a part of inner plate 26 and a part of outer plate 27. Refrigerator door 25 is constructed by covering open-cell urethane foam 5 with outer packaging material 55 including inner plate 26 and outer plate 27, and sealing the inside under vacuum. Heat welded part 36 has recess 37 having thickness t1 that is 50% or less of average thickness T1 of heat welded part 36.

Thus, the welded cross-sectional area is partially reduced, and an amount of gas that enters from the outside through the welded cross section is reduced. Accordingly, the degree of vacuum and the heat insulating performance of refrigerator door 25 can be maintained for a long period of time, and thus, refrigerator door 25 with high reliability is obtained.

In addition, heat welded part 36 has protrusion 38 with a thickness greater than average thickness T1 of heat welded part 36.

This reduces a leakage of resin to portions other than the pressed part during heat welding. In addition, the formation of protrusion 38 having a constant thickness in the pressed part can make the maximum thickness uniform, and thus, residual strain of flanges 26c and 27c can be reduced. Consequently, an occurrence of warpage, deformation, and cracks in heat welded part 36 can be prevented, whereby a degree of vacuum and heat insulating performance of refrigerator door 25 can be maintained for a long period of time.

In addition, width w1 of recess 37 may be set smaller than width w2 of protrusion 38. As a result, the amount of gas permeating from the outside is effectively reduced, and an occurrence of warpage, deformation, and cracks in heat welded part 36 is suppressed.

Further, protrusion 38 may be formed only on any one of surfaces of heat welded part 36. As a result, an exterior component (not shown) can be easily provided on a surface of heat welded part 36 where protrusion 38 is not provided.

In addition, recess 37 and protrusion 38 may be located adjacent to each other. With this configuration, a resin crushed by pressure applied for forming recess 37 moves to adjacent protrusion 38, so that a stable recess and protrusion pattern can be obtained.

In addition, the thickness of the resin sheet is desirably set to 0.2 mm or more. With this configuration, refrigerator door 25 (vacuum heat insulator) having a complicated shape can be obtained by resin molding such as blow molding or vacuum molding.

In addition, recess 37 may have a rounded cross-sectional shape. This configuration can prevent a loss of recessed shape when heat welded part 36 is released from the molds after heat welding.

When the vacuum heat insulator according to the present exemplary embodiment is used for a heat-insulating wall used for an inner wall and an outer wall of a refrigerating device, a freezer, or the like, a heat-insulating wall that is inexpensive and can maintain heat insulating performance for a long period of time is obtained. In addition, energy saving of these devices can be enhanced.

Second Exemplary Embodiment

[Structure]

A second exemplary embodiment will be described below with reference to FIGS. 6 to 10.

Figure 6:
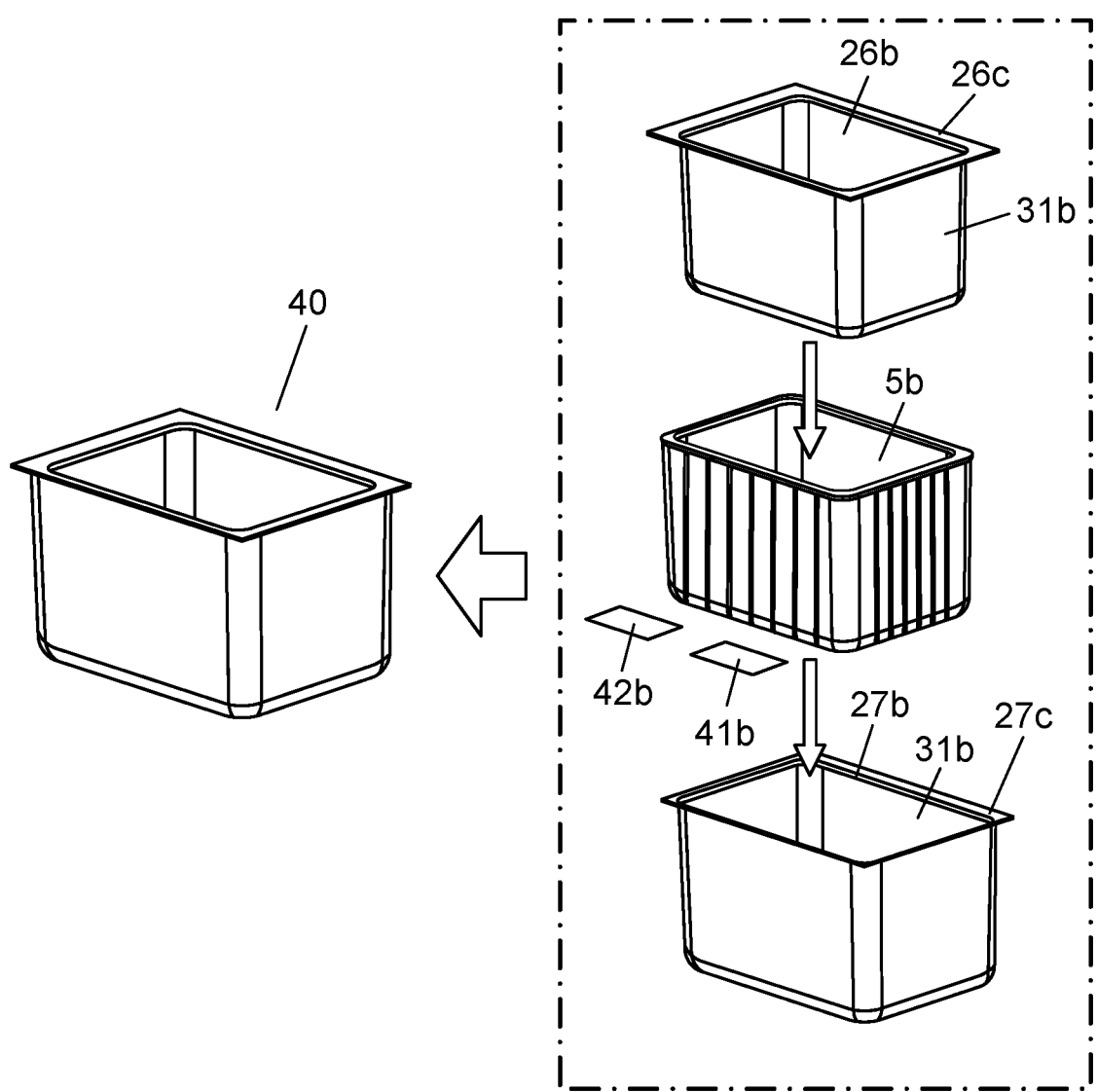
FIG. 6 shows a perspective view of a heat-insulating container according to a second exemplary embodiment and a developed perspective view of the heat-insulating container.
Figure 7A:
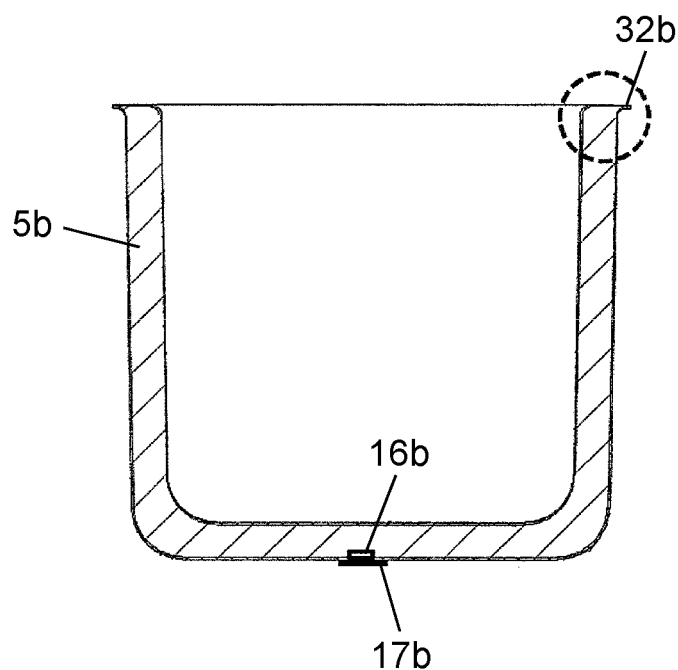
FIG. 7A is a cross-sectional view of the heat-insulating container according to the second exemplary embodiment.
Figure 7B:
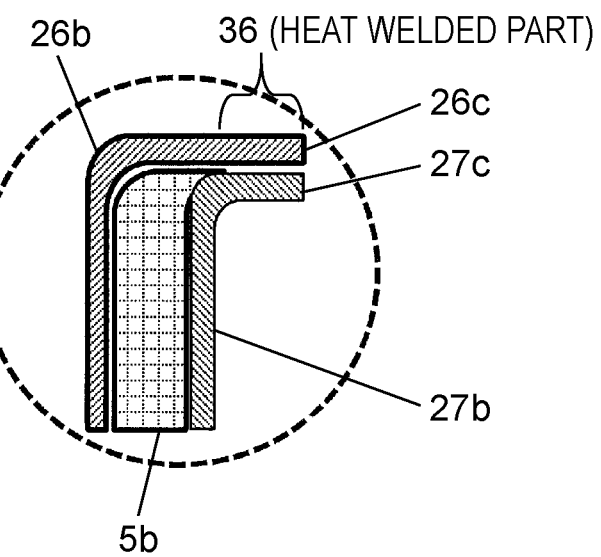
FIG. 7B is an enlarged cross-sectional view of a flange of the heat-insulating container according to the second exemplary embodiment.

In FIGS. 6, 7A, and 7B, heat-insulating container 40 includes: outer box 27b having gas barrier layer 31b such as oxygen formed therein; inner box 26b having gas barrier layer 31b such as oxygen formed therein; and open-cell urethane foam 5b (core material) that fills a heat-insulating space between outer box 27b and inner box 26b. Here, outer box 27b and inner box 26b correspond to outer packaging material 55.

Similar to the configuration described in the first exemplary embodiment, heat-insulating container 40 is evacuated through exhaust port 16b and sealed using sealing material 17b. Outer peripheries of outer box 27b and inner box 26b are bonded by heat welding layer 32b.

When open-cell urethane foam 5b is placed in outer box 27b, air adsorbent 42b that selectively adsorbs air and moisture adsorbent 41b that adsorbs moisture may be placed.

[Manufacturing Method]

Figure 8:
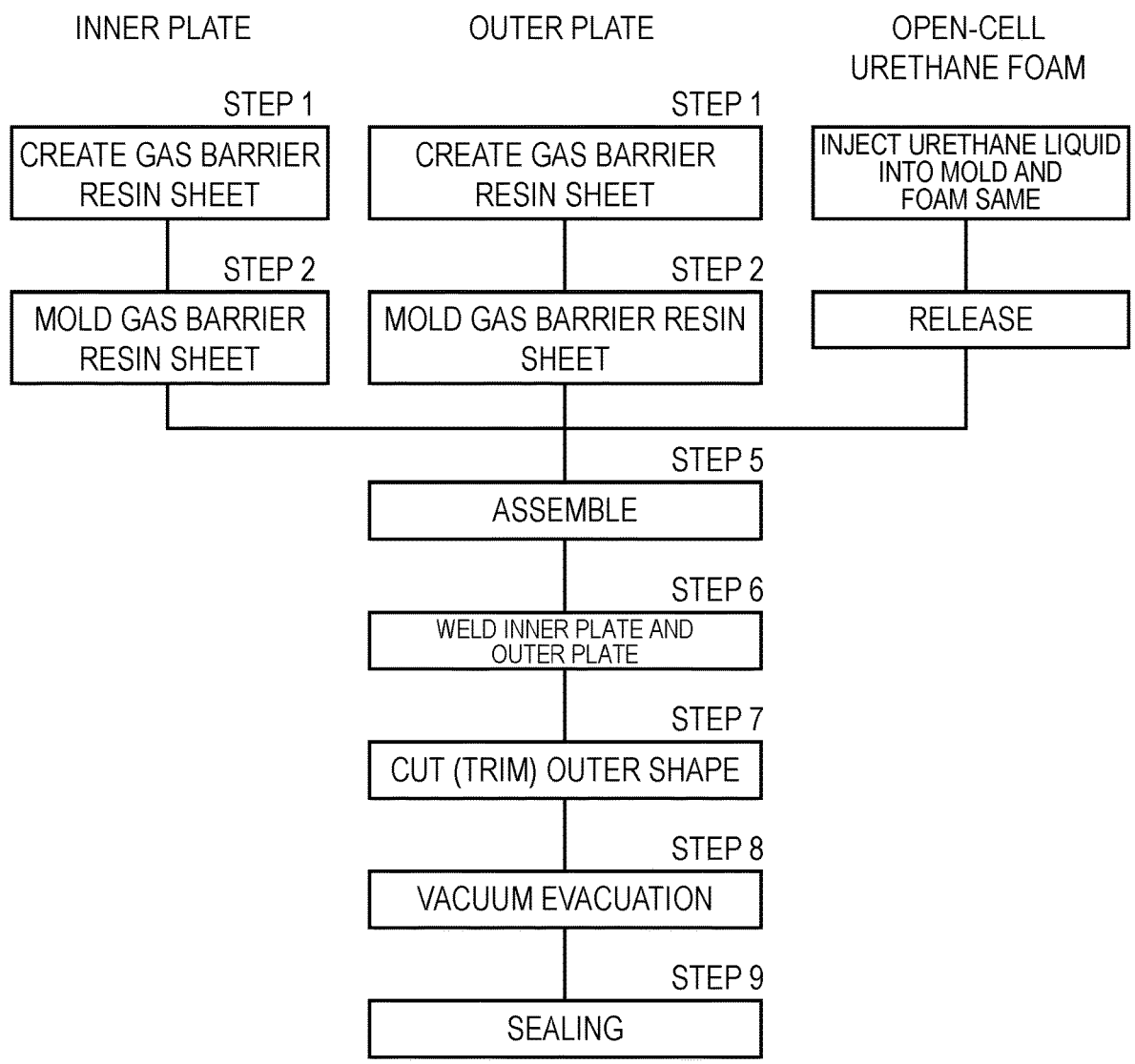
FIG. 8 is a flowchart illustrating a method for manufacturing the heat-insulating container according to the second exemplary embodiment.

FIG. 8 is a flowchart illustrating a method for manufacturing heat-insulating container 40 according to the second exemplary embodiment. The basic manufacturing process is similar to processes of steps 1 to 9 of the first exemplary embodiment.

In heat-insulating container 40, both outer box 27b and inner box 26b are not flat, and therefore, a resin sheet having a thickness of 0.2 mm or more is used for each of outer box 27b and inner box 26b.

Flange 26c of inner box 26b and flange 27c of outer box 27b are heat welded by applying heat and pressure thereto with upper mold 51 and lower mold 52 (see FIG. 9A) having protrusion 54 and recess 53, respectively.

Figure 9A:
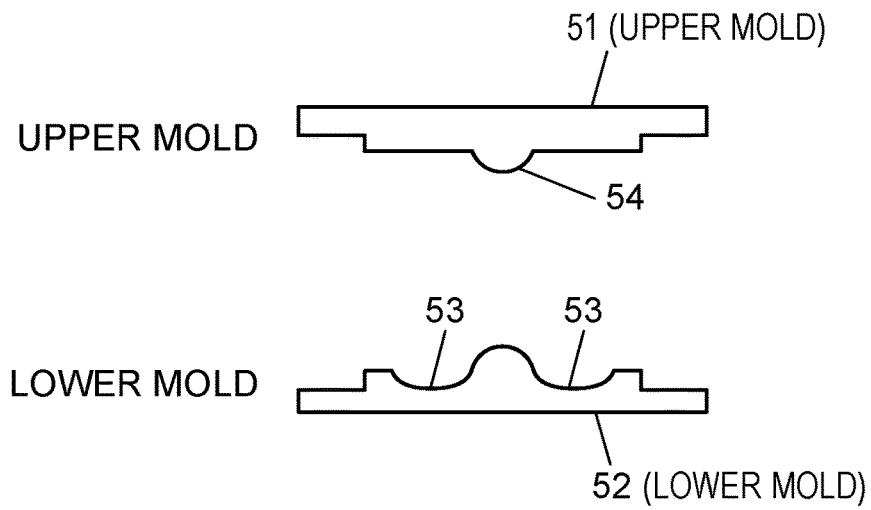
FIG. 9A is a cross-sectional view of a welding jig (upper mold, lower mold) for welding the flange of the heat-insulating container according to the second exemplary embodiment.
Figure 9B:
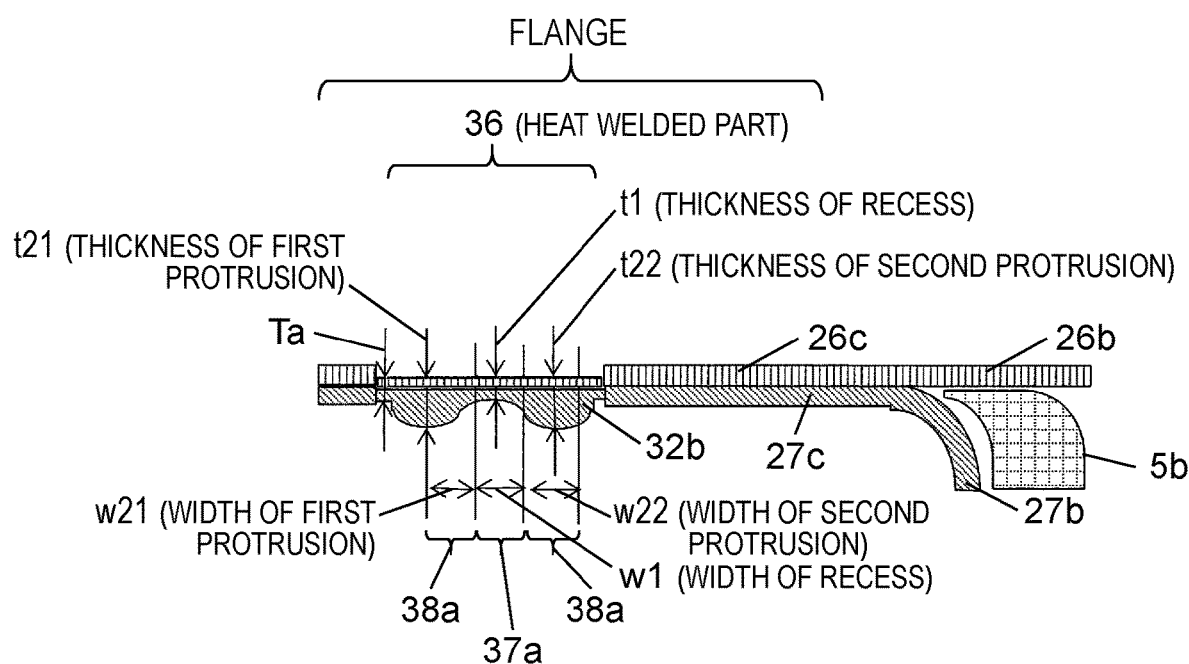
FIG. 9B is an enlarged cross-sectional view of the flange of the heat-insulating container according to the second exemplary embodiment.
Figure 9C:
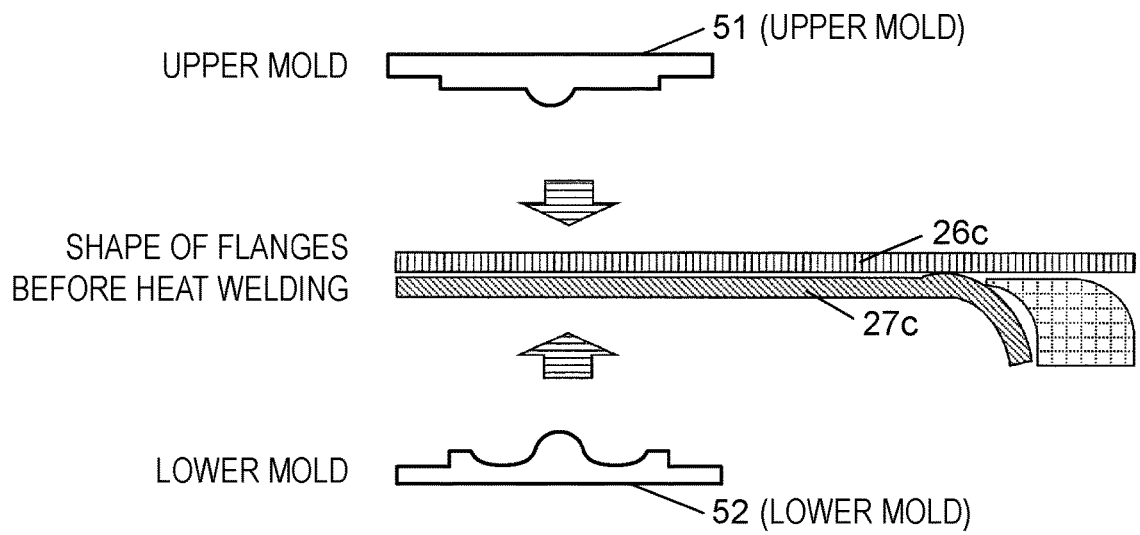
FIG. 9C is a cross-sectional view illustrating a positional relationship between the flange and the welding jig before heat welding of the heat-insulating container according to the second exemplary embodiment.
Figure 9D:
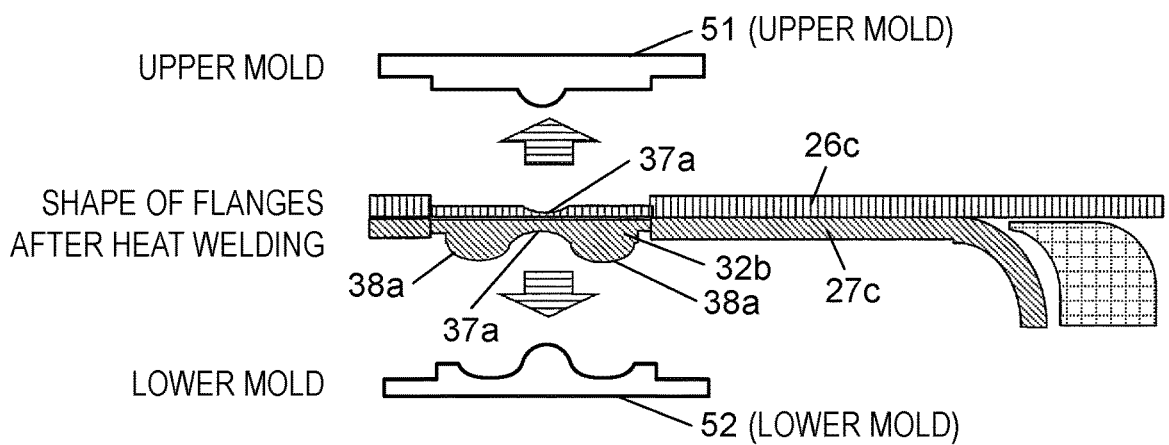
FIG. 9D is a cross-sectional view illustrating a positional relationship between the flange and the welding jig after heat welding of the heat-insulating container according to the second exemplary embodiment.

FIG. 9B shows the shape of heat welded part 36 of heat-insulating container 40 obtained by heat welding using upper mold 51 and lower mold 52. FIG. 9C illustrates, in cross section, flanges 26c and 27c immediately before being heat welded by upper mold 51 and lower mold 52. In addition, FIG. 9D illustrates, in cross section, flanges 26c and 27c immediately after being heat welded by upper mold 51 and lower mold 52 illustrated in FIG. 9A.

As shown in FIG. 9B, flat flange sections of outer box 27b and inner box 26b for heat welding are defined as flanges 26c and 27c, respectively. A section heated and pressed by upper mold 51 and lower mold 52 in FIG. 9A is defined as heat welded part 36. In addition, a portion having a smaller thickness than the average thickness of heat welded part 36 is defined as recess 37a, and a portion having a larger thickness is defined as protrusion 38a. In the present exemplary embodiment, there are two portions (first protrusion and second protrusion) having a thickness larger than the average thickness of heat welded part 36. In addition, the thickness of recess 37a is defined as t1, the thickness of first protrusion is defined as t21, the thickness of second protrusion is defined as t22, the width of the recess is defined as w1, the width of the first protrusion is defined as w21, and the width of the second protrusion is defined as w22.

Next, an evaluation result regarding an amount of gas permeating from the outside when thickness t1 and width w1 of recess 37a are changed (Table 1) and an evaluation result regarding an amount of warpage of flanges when the thickness and width of protrusion 38a are changed (Table 2) are shown below.

[Evaluation Results]

Table 1 shows thickness t1 and width w1 of recess 37a of heat welded part 36 obtained in the second exemplary embodiment and an evaluation result regarding an amount of permeating atmospheric gas.

TABLE 1

| Condition | Thickness of recess [mm] | Width of recess [mm] | Gas permeability [Pa/day] |
| --- | --- | --- | --- |
| 1 | 1 | 2 | $4.5 \times 10^{-3}$ |
| 2 | 0.6 | 2 | $2.8 \times 10^{-3}$ |
| 3 | 0.5 | 2 | $1.8 \times 10^{-3}$ |
| 4 | 0.3 | 2 | $1.5 \times 10^{-3}$ |
| 5 | 0.2 | 2 | $1.2 \times 10^{-3}$ |
| 6 | 1 | 3 | $3.3 \times 10^{-3}$ |
| 7 | 1 | 4 | $2.4 \times 10^{-3}$ |

Here, in flanges 26c and 27c, heat welded part 36 indicates a portion heated and pressed by upper mold 51 and lower mold 52. Average thickness Ta indicates an average thickness of heat welded part 36.

This result shows that the permeability of atmospheric gas decreases, as thickness t1 of recess 37a decreases, and as width w1 of recess 37a increases.

It can be seen that, when average thickness Ta of heat welded part 36 is 1.0 mm, the intrusion amount of gas can be significantly suppressed by setting thickness t1 of recess 37a to 0.5 mm or less, that is, 50% or less of average thickness Ta. As thickness t1 of recess 37a decreases, the intrusion amount of gas decreases. However, when thickness t1 is set to 0.2 mm or less, the strength of heat welded part 36 decreases, and thus, the heat welded part is easily broken.

Therefore, thickness t1 of recess 37a is desirably 0.3 mm or more, that is, 30% or more of average thickness Ta.

In addition, since it is desirable that the widths of flanges 26c and 27 are as small as possible so as not to interfere with other components, it is considered to be more effective to reduce thickness t1 of recess 37a rather than to unnecessarily increase width w1.

Table 2 indicates a tabulated list including thickness (t21, t22) and width (w21, w22) of protrusion 38a of heat welded part 36 obtained in the second exemplary embodiment and an evaluation result regarding an amount of warpage of the flanges and whether or not a leakage occurs.

TABLE 2

| Condition | Thickness of protrusion [mm] | Width of protrusion [mm] | Maximum thickness of portion other than welded part [mm] | Amount of warpage of flange [mm] | Leakage |
|---|---|---|---|---|---|
| 1 | 1 | 4 | 2.2 | 2 | Observed |
| 2 | 1.2 | 4 | 1.7 | 0.8 | Not observed |
| 3 | 1.4 | 4 | 1.5 | 0.2 | Not observed |
| 4 | 1.2 | 2 | 2.1 | 1.5 | Observed |
| 5 | 1.2 | 6 | 1.5 | 0.2 | Not observed |

Here, a maximum thickness of a portion other than heat welded part 36 means a portion of flanges 26c and 27c having a maximum thickness other than heat welded part 36. It can be seen from this result that, as the thickness of protrusion 38a increases, and as the width of protrusion 38a increases, the maximum thickness of a portion other than the heat welded part decreases, and the amount of warpage of the flanges 26c and 27c decreases. The reason why the maximum thickness of a portion other than heat welded part 36 decreases as the thickness of protrusion 38a increases and as the width of protrusion 38a increases is that an amount of resin to be heated and pressed decreases accordingly and thus a leakage of resin to portions other than heat welded part 36 decreases. As the leakage of resin decreases, a residual stress decreases, and the amount of warpage of entire flanges 26c and 27c decreases. Since it is desirable that the thickness of protrusion 38a is not larger than the maximum thicknesses of flanges 26c and 27c so as not to interfere with other components, it is considered to be effective to increase the width of protrusion 38a to the maximum in the width of heat welded part 36.

Figure 10A:
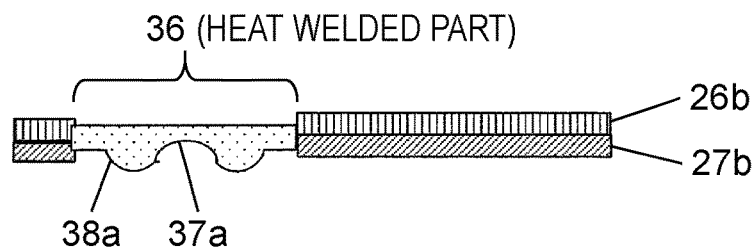
FIG. 10A is a cross-sectional view illustrating a shape pattern of a heat welded part of the heat-insulating container according to the second exemplary embodiment.
Figure 10B:
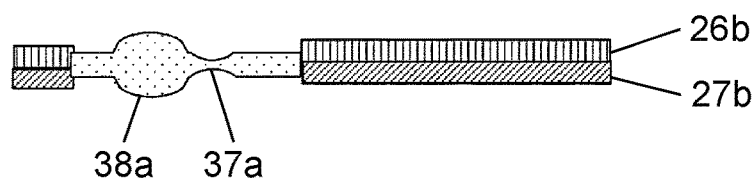
FIG. 10B is a cross-sectional view illustrating a shape pattern of the heat welded part of the heat-insulating container according to the second exemplary embodiment.
Figure 10C:
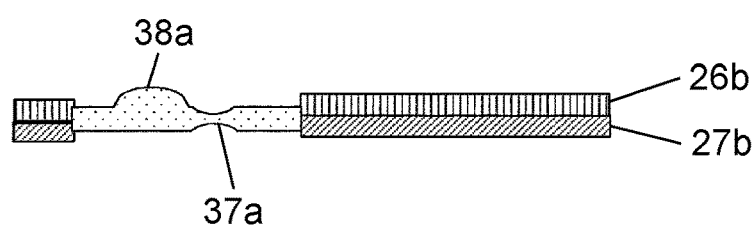
FIG. 10C is a cross-sectional view illustrating a shape pattern of the heat welded part of the heat-insulating container according to the second exemplary embodiment.
Figure 10D:
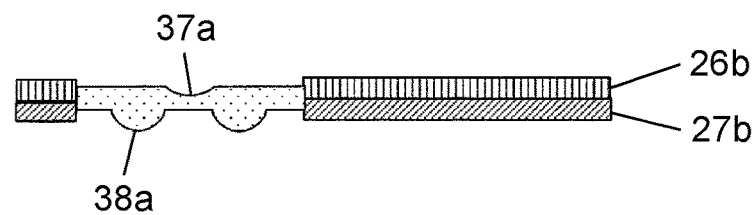
FIG. 10D is a cross-sectional view illustrating a shape pattern of the heat welded part of the heat-insulating container according to the second exemplary embodiment.

FIGS. 10A, 10B, 10C, and 10D illustrate various patterns of shape of heat welded part 36. FIG. 10A illustrates a pattern in which recess 37a is provided only on one side (lower side), and protrusions 38a are provided only on one side (lower side) so as to sandwich recess 37a. FIG. 10B illustrates a pattern in which recesses 37a are provided on both the upper and lower sides, and protrusions 38a are provided on both the upper and lower sides so as to be adjacent to recesses 37a on only one side (left side). FIG. 10C illustrates a pattern in which recesses 37a are provided on both the upper and lower sides, and protrusion 38a is provided on only one side (upper side) so as to be adjacent to one of recesses 37a on only one side (left side). FIG. 10D illustrates a pattern in which recess 37a is provided only on one side (upper side), and protrusions 38a are provided only on one side (lower side) so as to sandwich recess 37a. Although FIGS. 10A to 10D each illustrate representative examples, they may be combined to form other patterns.

Operation, Effect, and Others

When inner plate 26 in the first exemplary embodiment is formed into a box shape and used as inner box 26b, and outer plate 27 in the first exemplary embodiment is formed into a box shape and used as outer box 27b, it is possible to provide heat-insulating container 40 which is inexpensive and can maintain high heat insulating performance for a long period of time.

The present disclosure can provide a high-quality vacuum heat insulator that is inexpensive and has high heat insulating performance. The vacuum heat insulator can be widely applied as a heat insulator for consumer equipment such as a refrigerator and an electric water heater, a vending machine, an automobile, and a house, and can be widely applied as a heat-insulating container and a heat-insulating wall using the vacuum heat insulator.

The vacuum heat insulator can also be applied as a heat-insulating container such as a case for accommodating food in a storage chamber.

REFERENCE MARKS IN THE DRAWINGS

1: refrigerator
2: outer box
3: inner box
5, 5b: open-cell urethane foam (core material)
7: heat-insulating box
7a: front opening
8: partition
9: freezing compartment
10: refrigerating compartment
14: outside exterior component
15: inside exterior component
16, 16b: exhaust port
17, 17b: sealing material
18: compressor
19: evaporator
20: evaporating pan
21: cooling chamber wall
22: machine chamber
23: lower machine chamber
24: cooling chamber
25: refrigerator door (vacuum heat insulator)
26: inner plate
26b: inner box
26c, 27c: flange
27: outer plate
27b: outer box
31, 31b: gas barrier layer
32, 32b: heat welding layer
36: heat welded part
37, 37a, 53: recess
38, 38a, 54: protrusion
40: heat-insulating container
41b: moisture adsorbent
42b: air adsorbent
51: upper mold
52: lower mold
55: outer packaging material

The invention claimed is:

1. A vacuum heat insulator comprising:
a core material; and
an outer packaging material including an inner plate and an outer plate each of which includes a resin sheet,
the core material being covered by the outer packaging material, the vacuum heat insulator including a heat welded part formed by welding a part of the inner plate and a part of the outer plate, wherein the heat welded part has a recess having a thickness that is 50% or less of an average thickness of the heat welded part.

2. The vacuum heat insulator according to claim 1, wherein the heat welded part has a protrusion with a thickness greater than the average thickness of the heat welded part.

3. The vacuum heat insulator according to claim 2, wherein the recess has a width smaller than a width of the protrusion.

4. The vacuum heat insulator according to claim 2, wherein the heat welded part includes a first surface and a second surface facing the first surface, and the protrusion is provided only on the first surface.

5. The vacuum heat insulator according to claim 2, wherein the recess and the protrusion are located adjacent to each other.

6. The vacuum heat insulator according to claim 1, wherein the resin sheet has a thickness of 0.2 mm or more.

7. The vacuum heat insulator according to claim 1, wherein the recess has a rounded cross-sectional shape.

8. A heat-insulating container comprising an inner box and an outer box each of which has a box shape, wherein the inner plate in the vacuum heat insulator according to claim 1 is used as the inner box, and the outer plate in the vacuum heat insulator according to claim 1 is used as the outer box.

9. A heat-insulating wall comprising the vacuum heat insulator according to claim 1.

\* \* \* \* \*